(12) United States Patent
Sørensen et al.

(10) Patent No.: US 11,235,276 B2
(45) Date of Patent: Feb. 1, 2022

(54) PROCESS FOR REMOVAL OF AEROSOL DROPLETS

(71) Applicant: HALDOR TOPSØE A/S, Kgs. Lyngby (DK)

(72) Inventors: Per Aggerholm Sørensen, Kgs. Lyngby (DK); Morten Thellefsen, Hillerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 16 days.

(21) Appl. No.: 16/635,065

(22) PCT Filed: Jul. 27, 2018

(86) PCT No.: PCT/EP2018/070399
§ 371 (c)(1),
(2) Date: Jan. 29, 2020

(87) PCT Pub. No.: WO2019/030017
PCT Pub. Date: Feb. 14, 2019

(65) Prior Publication Data
US 2020/0246743 A1    Aug. 6, 2020

(30) Foreign Application Priority Data

Aug. 8, 2017 (DK) .......................... PA 2017 00438

(51) Int. Cl.
*B01D 50/00* (2006.01)
*B01D 45/08* (2006.01)
(Continued)

(52) U.S. Cl.
CPC .......... *B01D 50/002* (2013.01); *B01D 45/08* (2013.01); *B01D 46/003* (2013.01); *B01D 53/002* (2013.01)

(58) Field of Classification Search
CPC .... B01D 50/002; B01D 45/08; B01D 46/003; B01D 53/002; B01D 45/04; B01D 46/0031
See application file for complete search history.

(56) References Cited

U.S. PATENT DOCUMENTS 4,676,807 A * 6/1987 Miller ................ B01D 39/1623
55/487
7,614,390 B2    11/2009 Holzmann et al.
(Continued)

FOREIGN PATENT DOCUMENTS

CN         1038796 A       1/1990
DE     102007003436 A1     8/2007
(Continued)

OTHER PUBLICATIONS

Danish Search Report for Danish Application No. PA 2017 00438 dated Jan. 17, 2018 (8 pages).
(Continued)

*Primary Examiner* — Robert Clemente
(74) *Attorney, Agent, or Firm* — Buchanan Ingersoll & Rooney P.C.

(57) ABSTRACT

The present disclosure relates to a process for removal of an aerosol, comprising the steps of directing a process gas comprising an aerosol to contact an inertial demister providing a first demisted process gas, and directing the first demisted process gas to contact a coalescing demister providing a second demisted process gas, characterized in said first inertial demister being more open than said coalescing demister, where more open is defined as having a higher void fraction or a lower density with the associated benefit of such a process providing an efficient removal of a large volume of liquid from the inertial demister, while avoiding flooding of the demister system. It further relates to a (Continued)

process plant for sulfuric acid production employing such a pair of demisters.

12 Claims, 4 Drawing Sheets

(51) Int. Cl.
*B01D 46/00* (2006.01)
*B01D 53/00* (2006.01)

(56) References Cited

U.S. PATENT DOCUMENTS

| | | |
|---|---|---|
| 9,114,347 B2 | 8/2015 | Eyers et al. |
| 2006/0207234 A1 | 9/2006 | Ward et al. |
| 2013/0139689 A1 | 6/2013 | Schook |
| 2014/0048228 A1* | 2/2014 | Hansen ............ F25J 1/0002 165/58 |
| 2014/0110354 A1 | 4/2014 | Haberkamp et al. |
| 2015/0174519 A1 | 6/2015 | Zhang |

FOREIGN PATENT DOCUMENTS

| | | |
|---|---|---|
| EP | 2708274 A1 | 3/2014 |
| JP | 2011020026 A | 2/2011 |
| RU | 2233695 C1 | 8/2004 |
| RU | 2421267 C2 | 6/2011 |
| RU | 2602887 C1 | 11/2016 |
| SU | 1637835 A1 | 3/1991 |
| WO | 89/12024 A1 | 12/1989 |
| WO | 2010042706 A1 | 4/2010 |
| WO | 2014/065906 A1 | 5/2014 |
| WO | 2017029169 A1 | 2/2017 |

OTHER PUBLICATIONS

International Search Report (PCT/ISA/210) dated Oct. 30, 2018, by the European Patent Office as the International Searching Authority for International Application No. PCT/EP2018/070399.
Written Opinion (PCT/ISA/237) dated Oct. 30, 2018, by the European Patent Office as the International Searching Authority for International Application No. PCT/EP2018/070399.
Search Report by the China National Intellectual Property Administration of the People's Republic of China in corresponding Chinese Patent Application No. 201810834430.1, English Translation of the Search Report only, (2 pages).
Office Action and Search Report dated Nov. 26, 2021 by the Federal Service for Intellectual Property in Russian Patent Application No. 2020109874/04 (016315) and an English Translation of the Office Action and Search Report. (27 pages).
Office Action dated Nov. 16, 2021, by the Intellectual Property India, Government of India in corresponding Indian Patent Application No. 202017006067, and an English Translation of the Office Action. (7 pages).

* cited by examiner

PROCESS FOR REMOVAL OF AEROSOL DROPLETS

The present disclosure relates to a process for removal of aerosols, involving two demisters, an open inertial demister and a less open coalescing demister. More specifically the process relates to such a process used for removal of sulfuric acid mist and a process plant for condensation of sulfuric acid as well as a process plant for production of sulfuric acid.

In chemical processes, removal of aerosols is a common unit operation. Aerosol droplets are sufficiently small and light to be dragged along with the process gas stream. It is common practice in such processes to convert the small aerosol droplets to larger droplets by directing them to a coalescing demister, which will force an agglomeration of droplets to a size and a mass making them easier to collect in e.g. an open inertial demister. When the amount of aerosol droplets in a gas is high, a high volume of liquid will be collected in the demister, which can result in a downflow of liquid blocking the up-flow of gas. This phenomenon is called flooding, and may be highly problematic for the operation of a demister.

Especially when the demister is dense, flooding will occur at a lower liquid loading and/or gas velocity in the demister, since the decreased demister void also results in less volume for the downflow of condensed liquid and higher upward gas velocities inside the demister, and therefore care is typically taken to operate demisters below the so-called flooding limit.

We have now identified that an increased demister efficiency may be obtained if droplets are captured in an open inertial demister before the more complete removal in the less open coalescing demister. Thereby, the downflowing liquid captured in the initial part of the demister will have less cross-sectional area blocked by demister material. This has the consequence that the final coalescing demister may be even denser, since the majority of liquid already has been removed.

One important application for the present disclosure is the removal of sulfuric acid from a gas stream. Sulfuric acid may be produced by hydration of $SO_3$ followed by condensation of $H_2SO_4$, e.g. by the well-known WSA process. In this process the condenser and demister must be carefully designed to balance the requirement for full yield of sulfuric acid and efficient removal of acid mist. This requires designing demisters to be operable at high aerosol levels, while avoiding flooding, and at the same time providing efficient capture of small particles.

JP2011020026 discloses a process for removing moisture from a gas stream by drying with concentrated sulfuric acid. The process is designed for a combination of washout and exchange of demisters when these are blocked by precipitation of elementary sulfur, and for this purpose the first demister is more open than the second. The patent does not relate to issues of flooding by excessive amounts of condensed liquid.

US2006207234 relates to a design of oil filters, where the filter surface employs surface tension design to optimize filter function. There is no indication of flooding being a problem of concern, and no specific description of strategies to avoid flooding.

EP2708274 relates to a design of exhaust oxidation filters, in which heating of the demisters occur, to facilitate oxidation of oil and particulate matter. While the patent describes the risk of formation of a water film, it does not consider flooding a problem.

The prior art cited above does not specify the amount of aerosols in the gas comprising an aerosol, but from the nature of examples given it is estimated that in all cases it is below 1000 ppm wt, and thus not related to processes where flooding of the demister is a risk.

For the purpose of the present application an aerosol shall be construed as small droplets contained in a gas, where the drag forces exerted by the gas around the droplets substantially balances the gravity force on the droplets. Typically, aerosol droplet diameter will be below 25 μm.

For the purpose of the present application a demister shall be construed as a material open for flow, which causes removal of droplets and reduces the aerosol concentration in the gas leaving the demister.

For the purpose of the present application an inertial demister shall be construed as a demister having a void and structure causing reduction of aerosol concentration dominated by the mechanism of droplet inertia, i.e. the droplets impinge on the surfaces of the demister material and form a liquid film, that ultimately will drain off by gravity.

For the purpose of the present application a coalescing demister shall be construed as a demister having a void and structure causing reduction of aerosol concentration dominated by the mechanism of increasing droplet size.

As the demister mechanism is related to the amount of aerosols and the thermal conditions in the process, the determination of whether a demister is an inertial demister or a coalescing demister shall depend upon the specific conditions of the process. The inertial demister will, however, always be more open than a coalescing demister, as determined by at least one of the void fraction or density.

For the purpose of the present application condensable content in a gas under a set of conditions shall be construed as the volume (or mass) of liquid after condensation relative to the volume (or mass) of gas prior to condensation.

The present disclosure relates to a process for removal of an aerosol, comprising the steps of directing a process gas comprising an aerosol to contact an inertial demister providing a first demisted process gas, and directing the first demisted process gas to contact a coalescing demister providing a second demisted process gas, characterized in said first inertial demister being more open than said coalescing demister, where more open is defined as having a higher void fraction or a lower density with the associated benefit of such a process providing an efficient removal of a large volume of liquid from the inertial demister, while avoiding flooding of the demister system.

In a broad embodiment, the present disclosure relates to a process for removal of an aerosol, comprising the steps of directing a process gas comprising an aerosol to contact an inertial demister providing a first demisted process gas, and directing the first demisted process gas to contact a coalescing demister providing a second demisted process gas, characterized in said first inertial demister being more open than said coalescing demister, where more open is defined as having a higher void fraction or a lower density and the process gas entering the demister having an aerosol content being more than 5,000 ppm wt, 10,000 ppm wt or 20,000 ppm wt, with the associated benefit of such a process providing an efficient removal of a large volume of liquid from the inertial demister, while avoiding flooding of the demister system. The present disclosure shall also cover processes in which at least two demisters are used, as long as two of these demisters are used in a configuration as described above.

In a further embodiment said inertial demister has a void fraction of more than 0.90 and a void fraction of less than 0.99, 0.96 or 0.94, with the associated benefit of such a process providing an efficient removal in the inertial demister, avoiding flooding of the coalescing demister.

In a further embodiment said coalescing demister has a void fraction of more than 0.60, 0.75 or 0.82 and a void fraction of less than 0.90, with the associated benefit of such a process providing a highly efficient removal in the coalescing demister.

In a further embodiment said inertial demister has a density of more than 30 kg/m$^3$, 60 kg/m$^3$ or 80 kg/m$^3$ and a density of less than 100 kg/m$^3$, 120 kg/m$^3$ or 160 kg/m$^3$, with the associated benefit of such a process providing an efficient removal in the inertial demister, while avoiding flooding of the coalescing demister.

In a further embodiment said coalescing demister has a density of more than 170 kg/m$^3$, 180 kg/m$^3$ or 200 kg/m$^3$ and a density of less than 300 kg/m$^3$, 350 kg/m$^3$ or 500 kg/m$^3$, with the associated benefit of such a process providing a highly efficient removal in the coalescing demister.

In a further embodiment the ratio either between the void fraction of the coalescing demister and the void fraction of the inertial demister is more than 0.6, 0.75 or 0.80 and less than 0.99, 0.96 or 0.92, with the associated benefit of such a process providing a good balance between bulk removal in the inertial demister and a minimal release of non-collected aerosol from the coalescing demister.

In a further embodiment at least one demister is made from randomly oriented material, with the associated benefit of randomly oriented material, such as glass wool being inexpensive and highly open.

In a further embodiment at least one demister is made from structured material, such as knitted or woven filaments or threads, with the associated benefit of structured material providing a well-defined removal, with minimal pressure drop and maximum liquid draining properties.

In a further embodiment said inertial demister and said coalescing demister are provided as a single element, with the associated benefit of such a single element, having an open structure close the process gas inlet and a dense structure close to the process gas outlet, being simple to handle and install in the condenser.

In a further embodiment said inertial demister has a dimension in the direction of gas flow of more than 20 mm, 40 mm, 60 mm and a dimension in the direction of gas flow of less than 150 mm, 200 mm or 250 mm, with the associated benefit of such a process providing an efficient removal in the inertial demister, while avoiding flooding of the coalescing demister.

In a further embodiment said coalescing demister has a dimension in the direction of gas flow of more than 20 mm, 30 mm or 40 mm and a dimension in the direction of gas flow of less than 60 mm, 80 mm or 120 mm, with the associated benefit of such a process providing an efficient removal in the inertial demister, while avoiding flooding of the coalescing demister.

In a further embodiment the ratio between the dimension in the direction of gas flow of the inertial demister and the dimension in the direction of gas flow of the coalescing demister is more than 0.5, 1.0 or 1.5 and less than 10.0, 5.0 or 2.0, with the associated benefit of such a process providing a good balance between bulk removal in the inertial demister and a minimal release of non-collected mist from the coalescing demister.

In a further embodiment the superficial velocity of the gas entering the demister is more than 1.0 m/s, 2.0 m/s or 3.0 m/s and less than 7.0 m/s, 8.0 m/s or 10 m/s, with the associated benefit of such a process providing an efficient removal in the inertial demister, while avoiding flooding of the coalescing demister.

In a further embodiment the difference of the temperature of the process gas entering the demister and the process gas exiting the demister is less than 5° C., with the associated benefit of such a process being that the demister operates by collection of the condensated aerosols downstream condensation, and not by condensation, reaction or evaporation in the demisters.

In a further embodiment the process gas comprises a sulfuric acid aerosol in a concentration of sulfuric acid in the aerosol droplets at the contact with the inertial demister is above 50 wt %, 60 wt % or 70 wt % and below 99 wt %, 95 wt % or 90 wt %, with the associated benefit of this interval providing sufficient sulfuric acid for cost effective production of sulfuric acid.

In a further embodiment at least one demister is made from an inorganic material such as glass wool or a polymeric material such as fluoride based polymers including ethylene tetrafluoroethylene (ETFE), with the associated benefit of such materials being cost effective and robust with respect to the removal of corrosive liquids such as sulfuric acid at temperatures from 60° C. to 140° C. or 200° C.

In a further embodiment the demister is positioned in a heat and acid resistant vertical tube, such as a glass tube, in which the process gas flows inside the tube and a cooling medium, such as cooling air, flow outside the tube, with the associated benefit of such a process being well suited for production of concentrated sulfuric acid with an appropriate concentration of sulfuric acid, due to the evaporation of water from the sulfuric acid droplets during precipitation.

In a further embodiment the temperature of the process gas entering said inertial demister is above 60° C., 80° C. or 90° C. and below 120° C., 160° C. or 200° C., with the associated benefit of process gas in this temperature range comprising an appropriate amount of condensation of sulfuric acid vapor and providing an appropriate concentration of the condensed sulfuric acid.

A further aspect of the present disclosure relates to a sulfuric acid vapor condenser, comprising a process gas enclosure having a process gas inlet and a process gas outlet, a liquid outlet as well as a cooling medium enclosure having a cooling medium inlet and a cooling medium outlet, and wherein said liquid outlet is proximate to the process gas inlet and defines an upstream position with respect to process gas flow, said sulfuric acid condenser further comprising a inertial demister and a coalescing demister, wherein said inertial demister and said coalescing demister are positioned in the process gas enclosure, said inertial demister is positioned upstream said coalescing demister and said inertial demister is having void fraction being higher than the void fraction of said coalescing demister, with the associated benefit of such a condenser being able to condense high amounts of sulfuric acid, while avoiding release of acid mist to the environment. Typically, the demister is positioned at the upper end of a vertical condenser, such that the upstream inertial demister is below the coalescing demister, but the demisters may also be positioned downstream the section where condensation takes place, such that the upstream inertial demister is not below the downstream coalescing demister. In such a configuration an additional (minor) liquid outlet may be positioned proximate to the demisters.

In a further embodiment said process gas enclosure is a tube, with the associated benefit of a sulfuric acid vapor condenser based on a substantially vertical process gas tube being that many such condensers may be operated in parallel inside a single cooling medium enclosure.

In a further embodiment said cooling medium enclosure comprises a tube, with the associated benefit of a sulfuric acid vapor condenser based on one or more substantially horizontal cooling medium tubes being that a tall condenser may be constructed without the requirement for long tubes.

To optimize yield of condensables and minimize emissions, the need for efficient removal processes is evident. In the process of condensing sulfuric acid vapor, a significant source of emissions are aerosols formed during the condensation of the sulfuric acid vapor. An aerosol is a gas comprising small droplets, which do not precipitate be cause the drag forces exerted by the surrounding gas exceed the gravitational forces. If the droplet size is increased larger droplets may precipitate as the force of gravity be comes larger than the drag force.

A condenser is a heat exchanger receiving a warm process gas and a cold heat exchange medium, which are in thermal communication but not in fluid communication. By heat exchange the process gas is cooled and the heat exchange medium is heated. The warm process gas contains an amount of a condensable species. As the process gas is cooled below the dew point of the condensable species, it will condense on the cooled surfaces and may be collected at the bottom of the condenser. Therefore, a typical condenser will be a vertical design having a process gas inlet at the side of the bottom, a process gas outlet at the top, a heat exchange medium inlet at the top and a heat exchange medium outlet at the bottom in counter-flow with the process gas, but the heat exchange medium may also be substantially in cross-flow with the process gas flow, i.e. the dominating direction of flow may be substantially horizontal from one side of the condenser to the other side. The process gas and the heat exchange medium will be separated as in other heat exchangers.

The practical design of a condenser will often involve either the process gas or the heat exchange medium flowing in tubes. If the process gas flows in tubes, these must be substantially vertical, to allow withdrawal of condensate from the condenser bottom. Multiple process gas tubes will be inside the heat exchange medium enclosure. At the top of the condenser the outlet section of the condenser tubes will be separated from the heat exchange medium e.g. by a tube sheet. Each process gas tube will typically be cylindrical with a diameter between 40 mm and 50 mm, and seldom less than 10 mm or more than 100 mm. If the heat exchange medium flows in tubes, multiple heat exchange medium tubes will be inside the process gas enclosure, and the process gas enclosure will be substantially vertical and the heat exchange medium tubes, will typically be substantially horizontal tubes. In this case the process gas enclosure may have any cross-sectional shape, such rectangular, quadratic or circular. The cross-section may be several meters. Typically, 80% of the condensable content may condense directly on the cooled surfaces of the heat exchanger, but the remaining 20% may form an aerosol which will be dragged along with the gas flow.

Therefore, there is a risk that these aerosol droplets, which are difficult to remove, will be emitted to the environment unless handled appropriately.

To ensure minimal emission of aerosols a demister is often used. In a demister, processes are established to coalesce aerosol droplets in a coalescing demister into larger droplets, which will be collected. A coalescing demister will be designed with a dense structure, since the diffusion of aerosols will cause more collisions with the demister material, and thus more coalescence of fine aerosol droplets. The drag force of a rapid, often turbulent, gas flow may however entrain larger droplets to downstream processes. To avoid this entrainment, it is common practice to provide an inertial demister downstream a coalescing demister, thereby collecting the larger droplets.

With increasing environmental demands the need to reduce aerosol emission have caused a requirement for even more dense coalescing demisters, to avoid emission of the finest aerosols. This does however have a consequence of increased pressure drop and increased risk of flooding in the demister.

We have now identified that an efficient way of obtaining a highly efficient demister system is to provide an inertial demister prior to the coalescing demister. This design, contrary to customary practice will have the effect of removing a large fraction of droplets prior to the coalescing demister, which reduces the amount of liquid entering the coalescing demister and thus the risk of flooding.

A demister system involving an open inertial demister followed by a dense coalescing demister may be provided in two separate elements, or in a single element, which can be produced by knitting an open structure with two different densities.

Such a demister system employs the fact that in a condenser with upward gas flow, the droplet size distribution includes a high share of relatively large droplets but still small enough for drag forces to exceed the gravitational forces. By forcing the aerosols to collide with an open material in the inertial demister, the largest droplets will be collected and only the smallest droplets will be carried with the process gas to the downstream coalescing demister.

This means that a lower volume of liquid is present in the coalescing demister, which thus will be able to accept higher gas velocities before flooding occur.

The material of a demister may be organic polymers or minerals, depending on the required thermal and chemical resistance required, such as mineral wool, e.g. made from glass, rock, silica, alumina or borosilicate glass or polymers, including a wide range of organic polymers or, if chemical durability is important, fluoro-organic polymers, such as polytetrafluoroethylene, PTFE, or poly(ethylene tetrafluoroethylene), ETFE.

The morphology of a demister on the size scale of droplets can either be random or structured. Demisters may be made from plugs of unstructured mineral fibres having a typical filament fibre diameter between 0.2 µm and 0.1 mm or demisters may be made from plugs of unstructured polymeric fibres having a typical filament fibre diameter between 0.2 µm and 3 mm. To increase the predictability of demister parameters, the demister may also have a structured morphology. A structured demister may be made by knitting or weaving thread made from fibres or possibly from single filament. The thread may be made from a single type of fibre or a combination of several fibres. A structured demister may even be obtained by systematically or randomly winding thread, providing a dense structure proximate to the thread, and an open structure between the thread.

In the knitting process, a demister may be knitted continuously with a varying structure. For instance, the first contact with the gas may be with an open structure, followed by a dense structure. It may also be a possibility to have more than two different densities in a demister.

A demister may also be molded directly in an open mesh or net structure and the structure may also be 3D printed, to provide full control of the demister structure.

Where the process gas enclosure in a condenser is provided by tubes, a demister may conveniently be made from a knitted sheet, which is rolled to fit inside a cylindrical tube. Such a knitted demister may also be knitted to have three dimensions.

Where the heat exchange medium enclosure is provided by tubes inside the process gas enclosure, the process gas enclosure demister must cover the full area of the condenser outlet, and will therefore typically be provided as a pad of demister material. This pad may be a single inertial demister layer followed by a single coalescing demister layer, but the pad may also be multiple layers of each type, and optimal removal may be obtained by two or more pairs of demisters each comprising an inertial demister layer followed by a coalescing demister layer. The different types of demisters may be positioned immediately in contact with each other, or they may be separated from each other, by a void.

The material used for the demister must be compatible with the liquid condensed and the operating temperature. An important condenser application is related to production of sulfuric acid by condensation of $H_2SO_4$ vapor. In this case the emission limits for sulfuric acid define a need for highly efficient removal and control of sulfuric acid aerosols, and for this application materials resistant to sulfuric acid at temperatures from 60° C. to 140° C. or even to 200° C. are required. For removal of sulfuric acid, glass and mineral based materials or flouro-polymers are preferred for demisters.

An alternative process for withdrawal of noxious compounds from a gas, such as sulfur dioxide from a process gas, involves scrubbing the gas with a scrubbing liquid such as water, weak acid, sodium hydroxide or hydrogen peroxide. In such processes the process gas is directed to contact the scrubbing liquid, and the noxious gas, such as sulfur dioxide is dissolved in the scrubbing liquid. Such a process is simple, and the scrubbing liquid may be handled independently of the chemical process providing the process gas, and be transferred to a different location. Such a process may, however, result in formation of a mist over the scrubber, which must be removed by an appropriate demister, such as the one disclosed presently.

Two layer demisters according to the present disclosure may also be used in the removal or separation of water and hydrocarbon from natural gas and in the food and beverage industries for protection of downstream equipment.

The examples in the present text are focused on demisters positioned in a vertical tube, with an inertial demister below a coalescing demister, and with collected aerosol liquid flowing against the gas comprising an aerosol. However, the process may also be implemented in other configurations where a gas comprising an aerosol contacts an inertial demister before a coalescing demister, e.g. where the tube is substantially horizontal, and liquid flows substantially in a direction orthogonal to the gas flow. In such a configuration an additional liquid outlet may be positioned close to the demisters.

FIGURES

Figure 1:
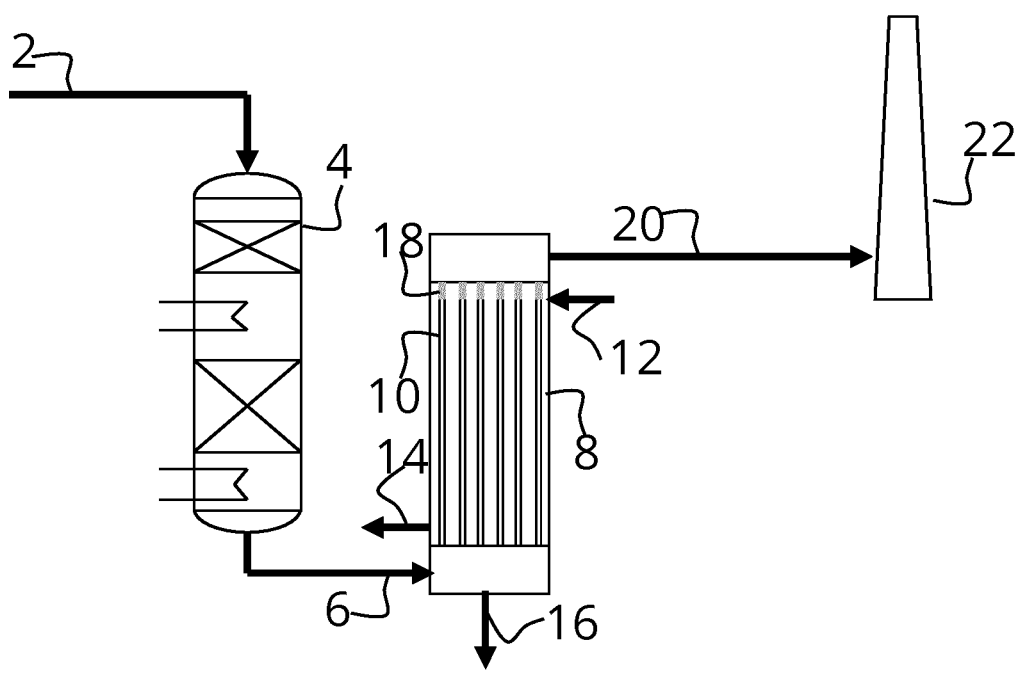
FIG. 1 shows a sulfuric acid plant comprising a condenser with process gas inside the tubes.

A process as shown in FIG. 1, for removal of $SO_2$ from process gases, with associated production of sulfuric acid is known from the prior art. In the process a feed gas 2 containing $SO_2$ is provided at a temperature sufficient for catalytic oxidation of $SO_2$ to $SO_3$ to be initiated such as around 370-420° C., to a catalytic reactor 4 in which oxidation of $SO_2$ to $SO_3$ takes place in the presence of an appropriate sulfuric acid catalyst. A range of such sulfuric acid catalysts are known to the person skilled in the art. One possible catalyst is vanadium oxide supported on a silica carrier material and promoted with alkali metals. Preferred alkali metals are potassium, sodium, and/or cesium.

To avoid pushing the $SO_2/SO_3$ equilibrium towards $SO_2$ while enjoying the benefit from high reaction rates at high temperatures, the oxidation is often carried out in two or three beds with intermediate heat exchangers, and followed by a further heat exchanger.

At the outlet from the catalytic reactor an oxidized process gas 6 is available. This oxidized process gas contains water vapor which as temperature is reduced hydrates $SO_3$ to form gaseous $H_2SO_4$, sulfuric acid. The oxidized and (partly) hydrated process gas is directed to a condensation unit 8 with the process gas enclosure formed by vertical glass tubes 10, in which the temperature is reduced to below the dew point of sulfuric acid, by heat exchange with a cold heat exchange medium, such as atmospheric air provided in heat exchange medium inlet 12 and withdrawn from heat exchange medium outlet 14. The sulfuric acid condenses and may be collected in concentrated form at the liquid outlet 16 at the bottom of the condensation unit. At the cold end of the vertical glass tubes 10, a demister 18 is provided in the tubes. Demisted process gas 20 is directed to the stack 22.

Figure 2:
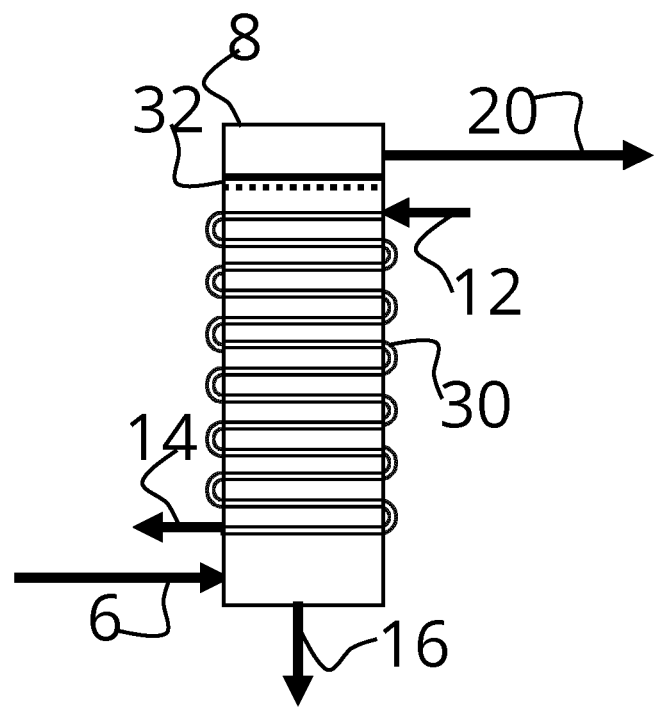
FIG. 2 shows a condenser with heat exchange medium inside the tubes.

FIG. 2 shows an alternative condenser. Here an oxidized and (partly) hydrated process gas 6 is directed to a condensation unit 8 in which the process gas enclosure surrounds a heating medium enclosure formed by horizontal glass tubes 30. The temperature of the process gas is reduced to below the dew point of the condensable liquid, by heat exchange with a cold heat exchange medium, such as atmospheric air provided in heat exchange medium inlet 12 and withdrawn from heat exchange medium outlet 14.

The liquid condenses and may be collected in concentrated form at the liquid outlet 16 at the bottom of the condensation unit. Proximate to the process gas outlet of the condensation unit a two-layer demister pad 32 according to the present disclosure is provided. Demised process gas 20 is directed to the stack.

Figure 3:
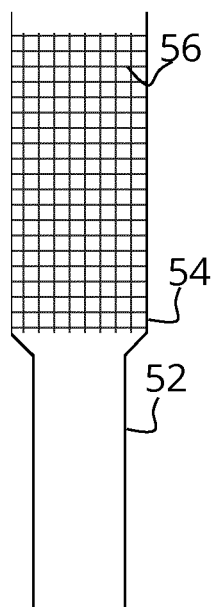
FIG. 3 shows a condenser tube with a single layer demister

FIG. 3 shows a demister being an embodiment according to the prior art in which the process gas enclosure is tubular, e.g. corresponding to the demister 18 of FIG. 1.

The process gas flows upward through the narrow section of the tube 52 and widens out when reaching the demister enclosure. The widening of the tube serves several purposes, i.e. reducing the gas velocity in the demister to avoid flooding, ensuring that the demister is fixed at the position within the enclosure and to provide a fixation point for the glass tube 52 in a tube sheet.

The process gas containing droplets flows upwards with a typical vertical superficial velocity between 1 and 7 m/s in a wide section of the tube 54. An inertial demister 56 is positioned in a wide section of the tube 54. When the droplets meet the demister 56, droplets with high inertia are collected. The smallest droplets will follow the gas path through the demister and will be collected at a much lower efficiency.

Had a demister with a more dense structure been chosen, the smallest droplets would be collected, but this would be associated with an increased risk of flooding, an increased pressure loss and a risk of entrainment of droplets from flooding at the exit of the demister.

Figure 4:
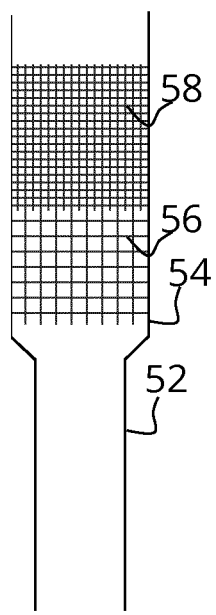
FIG. 4 shows a condenser tube with a two-layer demister

FIG. 4 shows a demister being an embodiment of the present disclosure in which the process gas enclosure is tubular, similar to FIG. 3.

The process gas flows upward through the narrow section of the tube 52 and widens out when reaching the demister enclosure. The widening of the tube serves several purposes, i.e. reducing the gas velocity in the demister to avoid flooding, ensuring that the demister is fixed at the position within the enclosure and to provide a fixation point for the glass tube 52 in a tube sheet.

The process gas containing droplets flows upwards with a typical vertical superficial velocity between 1 and 7 m/s in a wide section of the tube 54.

An inertial demister 56 is positioned below a coalescing demister 58 in a wide section of the tube 54. When the droplets meet the open inertial demister, a high fraction of large droplets are collected, forming a liquid film on the demister material and will drain from the demister. The smallest aerosol droplets follow the gas to the upper denser coalescing demister 58, in which they are efficiently collected, forming a liquid film and drain to the open demister below. The liquid loading of the coalescing filter is low and hence flooding of the demister is avoided.

EXAMPLES

Three examples are presented, to document the effect of the present invention.

Table 1 shows an estimate of droplet size distribution at the entrance to the demister, for a gas with a concentration of sulfuric acid aerosol out of the condenser of 50,000 ppm wt, calculated as 100% w/w $H_2SO_4$.

TABLE 1

| Droplet size | Wt % of sulfuric acid mist |
|---|---|
| <0.3 µm | 0.05 |
| 0.3-1.0 µm | 0.5 |
| 1.0-3.0 µm | 2 |
| 3.0-10 µm | 10 |
| >10 µm | 87.45 |

The first example according to the prior art shows a demister designed to remove only a moderate amount of the droplets having a size below 1 µm, corresponding to a condenser designed to remove acid mist to below 50 ppm wt, based on an inertial demister, with a void fraction of 90%.

The second example according to the prior art shows a demister designed to remove a high amount of the droplets having a size below 1 µm, based on a coalescing demister, with a void fraction of 86%. Due to high liquid loading, this demister is very likely to experience flooding due to entrainment of droplets, which may result in liquid carry over.

The third example according to the present disclosure shows a demister designed to remove a high amount of the droplets having a size below 1 µm, based on an inertial demister, with a void fraction of 90%, followed by a coalescing demister, with a void fraction of 86%. This solution provides efficient aerosol removal, while reducing the pressure drop and risk of demister flooding.

The void fraction was measured by determining the water displacement resulting from immersing a demister with a known volume, V, into a 250 ml graduated cylinder partly filled with water, $V_w$, at a temperature of 20° C. The sample was allowed to rest for 10 min before the new water level, $V_L$, was noted. The void was subsequently calculated as $$\text{Void} = 1 - \frac{V_L - V_W}{V}$$

Density refers to the density of the demister in the position it is installed in during operation, i.e. the mass of the demister, divided by the volume of process gas enclosure taken up by the demister.

TABLE 2

| | Example 1 | Example 2 | Example 3 |
|---|---|---|---|
| 0.1-0.3 µm droplet removal | 0 | 80 | 80 |
| 0.3-1.0 µm droplet removal | 94 | 98 | 98 |
| 1.0-3.0 µm droplet removal | 99 | 100 | 100 |
| 3.0-10 µm droplet removal | 100 | 100 | 100 |
| Inertial demister void | 90% | — | 90% |
| Inertial demister density | 90 kg/m$^3$ | — | 90 kg/m$^3$ |
| Inertial demister height | 190 mm | — | 100 mm |
| Coalescing demister void | — | 86% | 86% |
| Coalescing demister density | — | 200 kg/m$^3$ | 200 kg/m$^3$ |
| Coalescing demister height | — | 100 mm | 60 mm |
| Temperature upstream demister | 100° C. | 100° C. | 100° C. |
| Temperature downstream demister | 100° C. | 100° C. | 100° C. |
| Pressure drop | 60 mm $H_2O$ | 400 mm $H_2O$ | 120 mm $H_2O$ |
| ppmwt $H_2SO_4$ inlet to demister | 50000 | 50000 | 50000 |
| ppmwt $H_2SO_4$ in outlet | 50 | 10 | 10 |

From the three examples it is clear that increased removal efficiency may be achieved by operating a condenser with a dual demister according to the invention, with lower pressure drop compared to the denser demister alone. In addition the increased pressure drop, Example 2 would be associated with an increased risk of flooding, as practically all of the sulfuric acid droplets will be collected in the dense coalescing demister.

The invention claimed is:

1. A process for removal of an aerosol from a demister system and avoiding flooding of the demister system, comprising:
   a. cooling a process gas comprising at least 5,000 ppm wt of a condensable species under condensing conditions to provide a process gas comprising an aerosol,
   b. directing said process gas comprising an aerosol to contact an inertial demister providing a first demisted process gas, and c. directing the first demisted process gas to contact a coalescing demister providing a second demisted process gas, wherein d. said first inertial demister being more open than said coalescing demister, where more open is defined as having a higher void fraction or a lower density e. and the process gas entering the demister having an aerosol content being more than 5,000 ppm wt.

2. The process according to claim 1, wherein said inertial demister has a void fraction of more than 0.90 and a void fraction of less than 0.99.

3. The process according to claim 1, wherein said coalescing demister has a void fraction of more than 0.60 and a void fraction of less than 0.90.

4. The process according to claim 1, wherein said inertial demister has a density of more than 30 kg/m$^3$ and a density of less than 100 kg/m$^3$.

5. The process according to claim 1, wherein said coalescing demister has a density of more than 170 kg/m$^3$ and a density of less than 300 kg/m$^3$.

6. The process according to claim 1, wherein the inertial demister and coalescing demister both have a dimension in the direction of gas flow, wherein the ratio between the dimension in the direction of gas flow of the inertial demister and the dimension in the direction of gas flow of the coalescing demister is more than 0.5 and less than 10.0.

7. The process according to claim 1, wherein the gas entering the inertial demister has a superficial velocity more than 1.0 m/s and less than 7.0 m/s.

8. The process according to claim 1, wherein the difference of the temperature of the process gas entering the demister and the process gas exiting the demister is less than 5° C.

9. The process according to claim 1, wherein the process gas comprises a sulfuric acid aerosol with a concentration of sulfuric acid in the aerosol droplets at the contact with the inertial demister is above 50 wt % and below 99 wt %.

10. The process according to claim 9, wherein at least one demister is made from an inorganic material or a polymeric material.

11. The process according to claim 9, wherein the demister is positioned in a heat and acid resistant vertical tube, in which the process gas flows inside the tube and a cooling medium flow outside the tube.

12. The process according to claim 9, wherein the temperature of the process gas entering said inertial demister is above 60° C. and below 120° C.

* * * * *